US007979998B2

(12) United States Patent
Ziegmann

(10) Patent No.: US 7,979,998 B2
(45) Date of Patent: Jul. 19, 2011

(54) SLIDE MOUNTING TOOL AND METHOD OF USE

(76) Inventor: Neil Ziegmann, Lake View, IA (US)

(*) Notice: Subject to any disclaimer, the term of this patent is extended or adjusted under 35 U.S.C. 154(b) by 0 days.

(21) Appl. No.: 12/614,891

(22) Filed: Nov. 9, 2009

(65) Prior Publication Data

US 2011/0107615 A1 May 12, 2011

(51) Int. Cl.
*G01D 21/00* (2006.01)

(52) U.S. Cl. ................. 33/645; 33/474; 33/481; 33/667

(58) Field of Classification Search .................... 33/427, 33/429, 645, 474, 480, 481, 194, 667
See application file for complete search history.

(56) References Cited

U.S. PATENT DOCUMENTS

| | | | | |
|---|---|---|---|---|
| 2,761,215 | A * | 9/1956 | Macklanburg | 33/343 |
| 3,499,225 | A * | 3/1970 | Darrah | 33/347 |
| 5,855,073 | A * | 1/1999 | Boelling | 33/533 |
| 6,442,853 | B1 * | 9/2002 | Hale et al. | 33/194 |
| 6,729,033 | B2 * | 5/2004 | Jevons et al. | 33/481 |
| 7,009,480 | B2 * | 3/2006 | Tsui et al. | 335/287 |
| 7,055,256 | B2 * | 6/2006 | Alecci | 33/392 |
| 7,281,338 | B2 * | 10/2007 | Ziegmann et al. | 33/645 |
| 2002/0069541 | A1 * | 6/2002 | Sumner | 33/194 |
| 2005/0257389 | A1 * | 11/2005 | Pierson et al. | 33/194 |
| 2005/0278962 | A1 * | 12/2005 | Klonowski | 33/194 |

OTHER PUBLICATIONS

"Sommerfeld's Tools for Wood", Catalog 7, (published prior to Sep. 2003.*

* cited by examiner

*Primary Examiner* — Christopher W Fulton
(74) *Attorney, Agent, or Firm* — McKee, Voorhees & Sease, P.L.C.

(57) ABSTRACT

Described herein is an improved tool and method for installing undermount drawer slides in a cabinet. The undermount drawer slides are of the type commonly used to conceal the drawer slide from a user for improved aesthetics. The tool is designed so that the drawer slide fits snugly and securely to the tool and the drawer slide may be adjusted horizontally or vertically without moving or becoming displaced easily. The method of using the tool provides a means for securely attaching the drawer slide within the cabinet without variation, thereby ensuring that drawers open and close smoothly and securely.

8 Claims, 6 Drawing Sheets

SLIDE MOUNTING TOOL AND METHOD OF USE

BACKGROUND OF THE INVENTION

Proper installation of drawers and sliding shelves in pull-out shelves, cabinets, desks, entertainment centers, and other furniture is a necessarily precise function. Drawers which do not have slides installed level and at the correct height may stick, fail to properly and smoothly open or close, or appear unsightly. Additionally, drawers require matching slides on opposite ends of the drawer, and it is important that the slides are similarly positioned relative to the cabinet in order to ensure smooth travel of the drawer along the entire slide.

Applicant's previous application Ser. No. 10/954,637, filed Sep. 30, 2004, now issued as U.S. Pat. No. 7,281,338 on Oct. 16, 2007, herein incorporated by reference in its entirety, described a particular slide mounting tool for use with a variety of slide designs. For example, one type of commonly used slide design is the European epoxy slide, shown in the '338 patent in FIGS. 4A and 4B. These types of slides are inexpensive and low profile, but do not allow the drawer to completely slide out of its seating. A separate type of slide design, the full extension, shown in FIGS. 6A-6D of the '338 patent, allow the drawer to completely slide out of its seating, but are more expensive. Applicant's prior art design described in the '338 patent is intended to be used with and fits both of these design styles.

However, Applicant's prior device and other available devices are unable to adequately support undermount drawer slides. These undermount slides have an L-shaped bracket with one leg that attaches to the cabinet. The other leg of the L-shaped bracket extends under the drawer and supports the slide mechanism. The slide mechanism is therefore concealed from view of an individual opening the drawer.

Applicant's existing device is unsuitable for use with these modern undermount slides. As shown in FIG. 1 of the '338 patent, the existing device includes a lower ledge 107 on which the slide rests during installation. Undermount slides, having an L-shaped bracket, cannot fit around this ledge, and therefore cannot be used with this product. It is therefore necessary to design a novel device which accomplishes the object of supporting these undermount slides.

Unlike other slides, undermount slides allow the drawer or shelf to completely slide out of the pocket in which the drawer rests. This allows consumers to use more of the drawer space without having to move objects out of the way to access items in the rear of the drawer.

Furthermore, unlike other drawer slides, the undermount slides may be positioned offset from the cabinet edge at a distance. This installation option is useful in further concealing the drawer slide from view.

Therefore, there is recognized in the art a need for an improved tool which may be used to install undermount drawer slides.

There is further recognized in the art a need for an improved tool which may be used to securely hold an undermount drawer slide in a proper position.

There is further recognized in the art a need for an improved tool which can position the drawer slide offset from the cabinet to which the drawer is being installed.

There is further recognized in the art a need for an improved tool which can align the drawer slide vertically within the cabinet.

For the reasons stated above, and for other reasons stated below which will become apparent to those skilled in the art upon reading and understanding the present specification, there is a need in the art for improved slide mounting tools and methods.

BRIEF SUMMARY OF THE INVENTION

An improved tool is provided for use in installing drawer slides to a cabinet. The tool has a vertical and a horizontal member, each with a top, bottom, front, back, and opposing faces. The vertical member includes a handle and a flat plane, while the horizontal member includes a lip offset from the bottom and square with the flat plane on the vertical member. Additionally, one or more magnets may be disposed on the horizontal member for holding the drawer slide securely to the tool.

A method for installing undermount drawer slides is also provided. A tool and a drawer slide are provided. The drawer slide and tool are positioned together to place the drawer slide in a repeatable and secure position. The plane face of the tool is placed adjacent a cabinet to which the drawer slide is to be attached. The drawer slide is fastened to the cabinet and the tool is removed from the drawer slide. By utilizing this method to install a drawer slide, the drawer slide is accurately positioned at a set height, levelness, and distance in from the edge of the cabinet in a repeatable manner.

DETAILED DESCRIPTION OF THE PREFERRED EMBODIMENT

Figure 1:
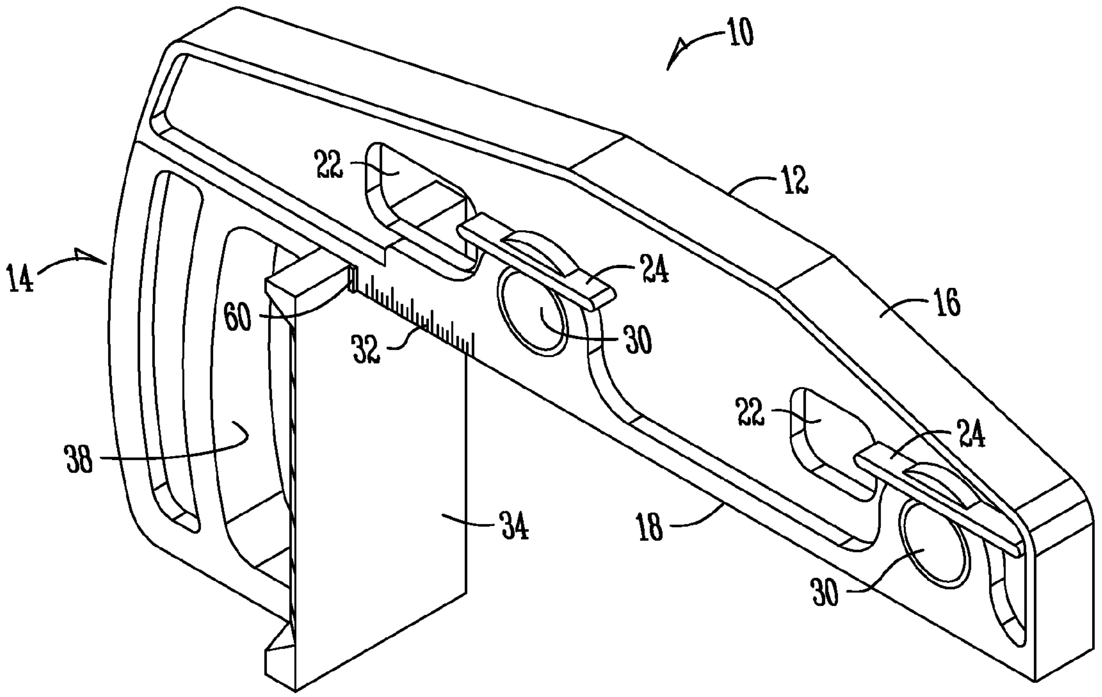
FIG. 1 is a perspective view of the improved tool according to one embodiment.

The preferred embodiment of the invention will now be described with reference to the accompanying drawings wherein numerals refer to their like in the drawings. These embodiments are described in detail to enable those skilled in the art to practice the invention, and it is to be understood that other embodiments may be utilized without departing from the spirit and scope of the present inventions. Any limitations to the invention herein described are limited to allowed claims and their functional equivalents. The preferred embodiment is generally shown in FIG. 1 in a perspective view.

The preferred embodiment of the invention is a slide mounting tool 10 for use in mounting drawers to cabinets. Although drawer slides are the preferred hardware for mounting, other hardware may be mounted utilizing the invention. For example, sliding shelves, racks, or other furniture extras may be installed to the slides. Furthermore, additional hardware other than slides may be installed utilizing the preferred embodiment.

The preferred embodiment will first be described by its independent physical properties. The preferred embodiment will then be described in relationship to its preferred accompanying drawer slide. Finally, the preferred embodiment will be described as it relates to the use of the tool.

It is to be understood that certain terms have specific meanings as applied to the following description.

The term “installer” means an individual installing a drawer slide to a cabinet.

The term “user” means an individual opening, closing, or otherwise operating a drawer which has been installed within the cabinet.

The term “square” means a right angle, defined as 90 degrees plus or minus manufacturing tolerances. For example, a precision T-square, a commonly used woodworking tool, may have a tolerance of 1/32" over 39.25". This means that at a point 39.25" away from one square surface, the t-square may be off by as much as 1/32". This means that the “square” tool may actually be 89.95°, rather than 90°. Other squares may be less precise, for example having a tolerance of 90°+/−2.5°. Alternatively, if an angle is to be maintained at an absolute lower limit, the tolerance may be 90°+/−5°/0° (meaning an upper limit of 95° and a lower limit of 90°, while maintaining an error of 2.5°).

Structure of the Tool

As shown in FIG. 1, the slide mounting tool 10 generally comprises an L-shaped extrusion with a horizontal arm 12 and a vertical leg 14. While it is preferred that the tool is L-shaped, it is further recognized that the tool may be triangular, T-shaped, I-shaped, C-shaped, or any other shape meeting the general functional requirements of the tool.

According to the preferred embodiment, the tool 10 is symmetrical and has the same features or mounting structure on each of the opposing faces 20. However, it is anticipated that the faces 20 may be different for different purposes. For example, left- and right-side drawer slides may have different mounting profiles. It would then be necessary to have different mounting structure on either side of the tool 10 in order to properly mount the set of drawer slides. However, the preferred embodiment anticipates utilizing symmetrical drawer slide mounts and therefore is described to be symmetrical.

The horizontal arm 12 is preferably an elongated rectangular shape and has a top 16, bottom 18, and opposing faces 20. The bottom 18 is preferably flat while the top 16 may have any shape. Positioned along the horizontal arm 12 and extending through the opposing faces 20 are cutouts 22. These cutouts 22 are designed to be aligned with screw or fastener holes in the mounting bracket of a drawer slide and allow the installer to access the fastener holes without removing the tool.

Positioned on the face 20 of the horizontal arm 12 are one or more lips 24 which extend outwardly from the face 20. These lips are preferably parallel to the bottom 18 and collinear with one another. While the lips 24 are generally shown as elongated protrusions, it is to be understood that the lips 24 may take additional forms. For example, the lips may be cylindrical, square, ovoid, or other shaped bosses, or the face 20 may be extended outward and the lips 24 are the beginning of a recessed portion of the arm 12. It is most important that the bottom surfaces 26 (see FIG. 2) of the lips 24 are collinear and the lips 24 extend outward from the face relative to the bottom 18 of the arm 12. The width 28 or overall profile of the lips 24 is unimportant. It is further contemplated that the lip 24 may be a single extension along the length of the horizontal component 12. Another option is stepped lips 24, allowing for drawer slides of varying widths to be used.

Also positioned on the arm 12 are one or more magnets 30. These magnets 30 are securely fastened to the arm 12 so as not to be easily removed. One method of installing these magnets 30 has been expressly detailed in Applicant’s prior application, now issued as U.S. Pat. No. 7,281,338. These magnets 30 are shown to be circular in the preferred embodiment, but it is understood that the magnets may be of any shape or size. It is preferred that two magnets 30 be used to securely hold the drawer slide to the tool 10. These magnets should be arranged so that they hold opposite ends of the drawer slide, with one magnet having a “north” and one a “south” orientation on each exposed face 20. This arrangement of opposing faces ensures that a firm magnetic force is maintained between the tool 10 and slide.

Another element on the arm 12 is a series of graduations 32. These graduations 32 measure a distance from the flat plane 34 of the vertical component 14. The graduations 32 are preferably at a fixed distance from one another, and are in either English or metric units. However, it may be desirable to have non-uniform graduations, such as a series of preset distances at, by way of example, ¼", ½", and 1", labeled as “A”, “B”, and “C”. Such non-uniform graduations would be useful, for example, in a mass assembly factory where only the given preset distances are used and other graduations would be unnecessary.

Attached to or integrally formed with the arm 12 is the leg 14. According to the preferred embodiment, the leg 14 is part of a single piece plastic molding of all of the component parts. However, it can be appreciated that other variations are possible. For example, the leg 14 may be a separate part, fastened or attached to the horizontal component 12. Alternatively, the leg 14 may include portions of the arm 12 and a second horizontal component may be fastened to the vertical leg and horizontal arm.

Figure 2:
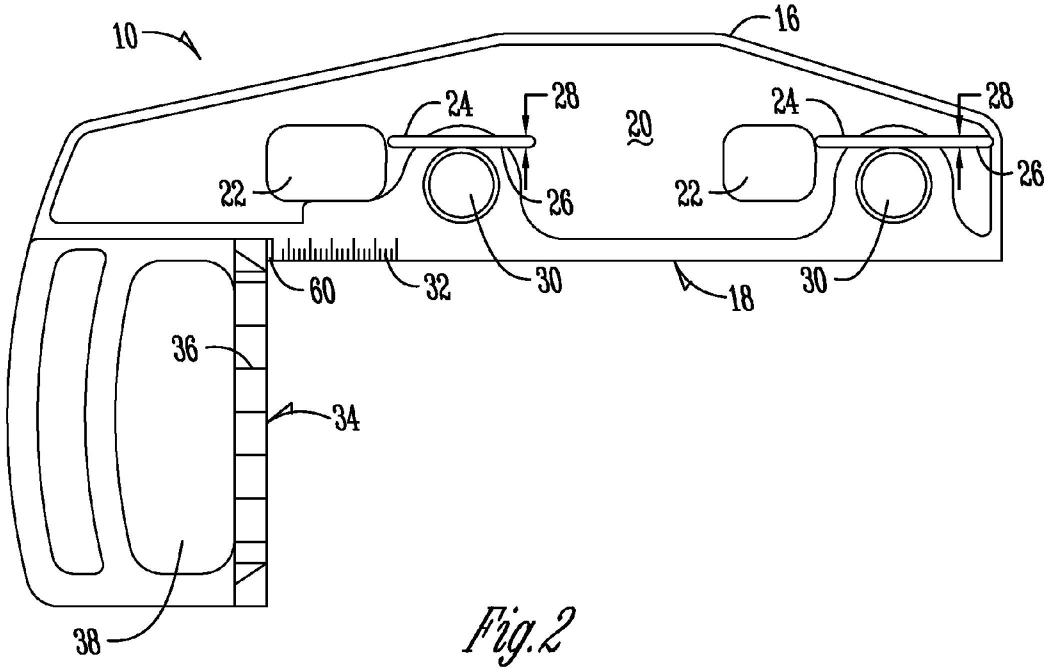
FIGS. 2 and 3 are opposite side elevation views of the improved tool according to one embodiment.
Figure 3:
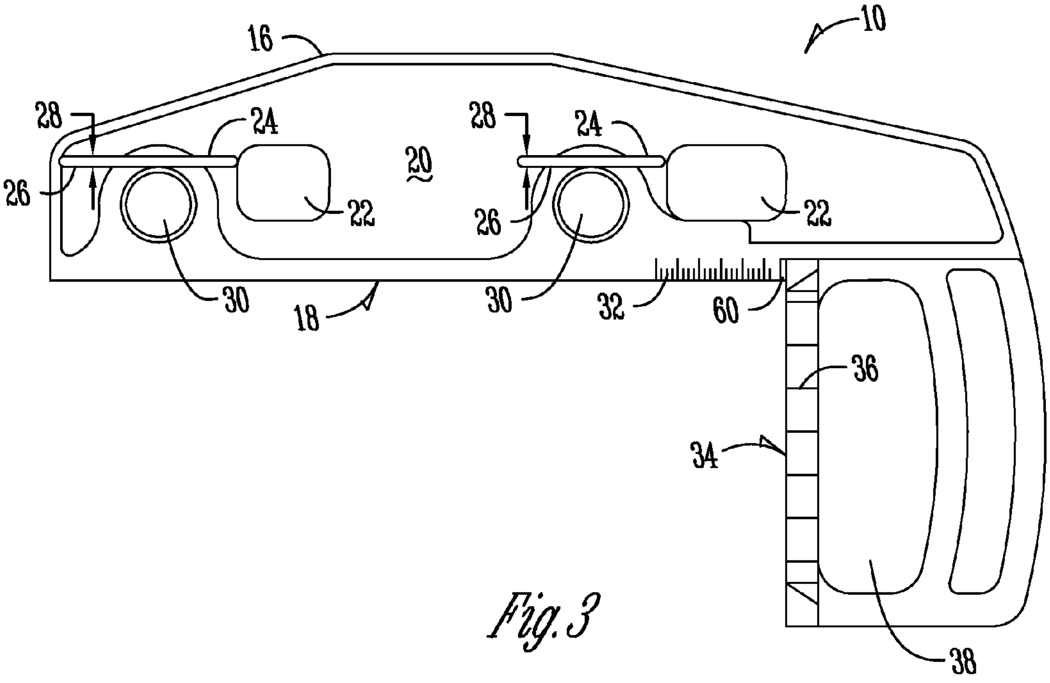

The leg 14 preferably includes a flat plane 34. This flat plane 34 is preferably square to the lower surface 26 of the lips 24. As shown in FIGS. 1-3, the flat plane 34 is also square to the bottom 18 of the arm 12, although the bottom 18 may be designed so that it is not parallel to the bottom 26 of the lips 24, and therefore not square to the flat plane 34. As shown in FIG. 1, the flat plane 34 may extend outwardly from either side of the tool 10. This extension provides greater precision in positioning the tool 10. With this extension, the tool may be positioned adjacent a cabinet on either side, or may be positioned on a crossbar which passes under the drawer opening.

Positioned on the flat plane 34 are a plurality of graduations 36. These graduations are equally spaced to indicate a distance from the bottom 18 of the arm 12. With reference to additional hardware or other features on a cabinet, an installer may align the drawer slide to a preferred height. The graduations may be metric, English, or other units and need not be uniform, according to the needs of the installer.

According to the preferred embodiment, on the leg 14 includes a handle 38. In a preferred embodiment, the handle 38 is generally formed by a cavity passing through the leg 14. The handle 38 is generally shaped to be ergonomically gripped by a user, although other variations are anticipated. For example, the handle may include finger grips, be square shaped, or not be included at all. The handle may alternatively be moved, either to the arm 12 or inside the area bounded by the arm and leg, thereby forming a triangular rather than L-shaped tool.

A small boss 60 may also be installed at the corner between the vertical and horizontal components. According to one embodiment, the drawer slide must be installed at a set distance in from the cabinet edge and cannot be installed flush. This boss 60 is molded into the tool 10 at this distance, preventing installers from installing the drawer slide in an unacceptable position. In the preferred embodiment, this distance is 1/16". It is further contemplated that this distance may be modified according to the manufacturer’s specification, although an installer may use the graduations 32 to determine the distance himself. The boss 60 may also be extended along the length of the horizontal component 12 to allow slides to be installed only at a set distance, such as in a high-throughput manufacturing facility.

Tool and Drawer Slide

Figure 4:
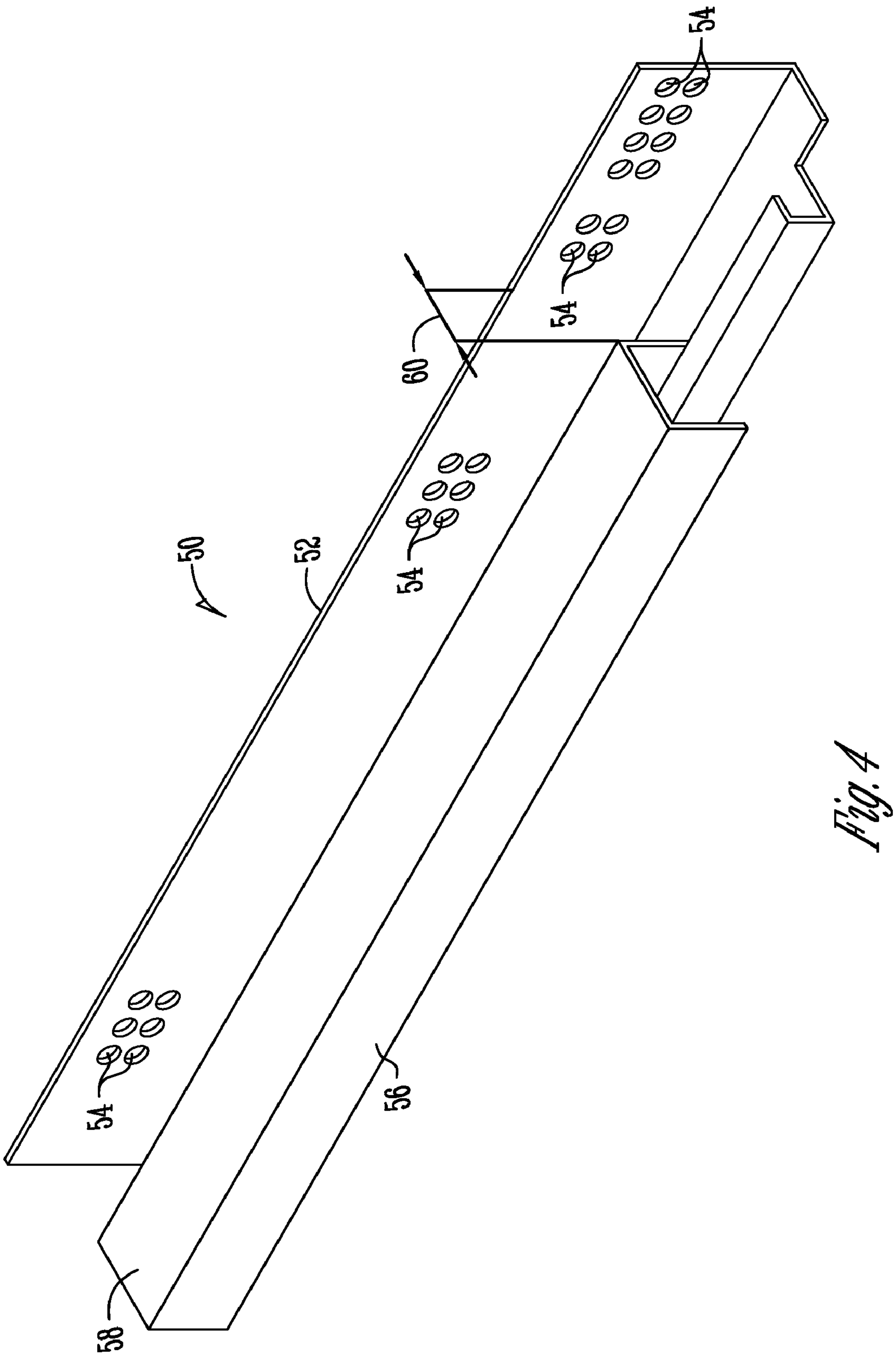
FIG. 4 is a perspective view of an undermount drawer slide in a closed position.

The undermount drawer slide 50 to be used with the preferred embodiment is shown in perspective in FIG. 4. The drawer slide 50 generally comprises two parts, a mounting bracket 52 and a sliding mechanism 56. The mounting bracket 52 and sliding mechanism 56 are separated by a gap 60.

The mounting bracket 52 has a plurality of holes 54 spaced apart along the length of the bracket 52. According to one embodiment, the holes are equally sized to receive a single size screw. However, the holes 54 may be of various sizes to accommodate fasteners of various sizes and types.

The sliding mechanism 56 is shown generally without all of the working components. A drawer attaches to the top 58 of the sliding mechanism 56, through fasteners, adhesive, or any other type of attachment means. The means of attaching the drawer to the undermount slide is not the focus of this application. Preferably, the sliding mechanism is of a type which allows the drawer to fully extend out of the drawer housing.

Figure 5:
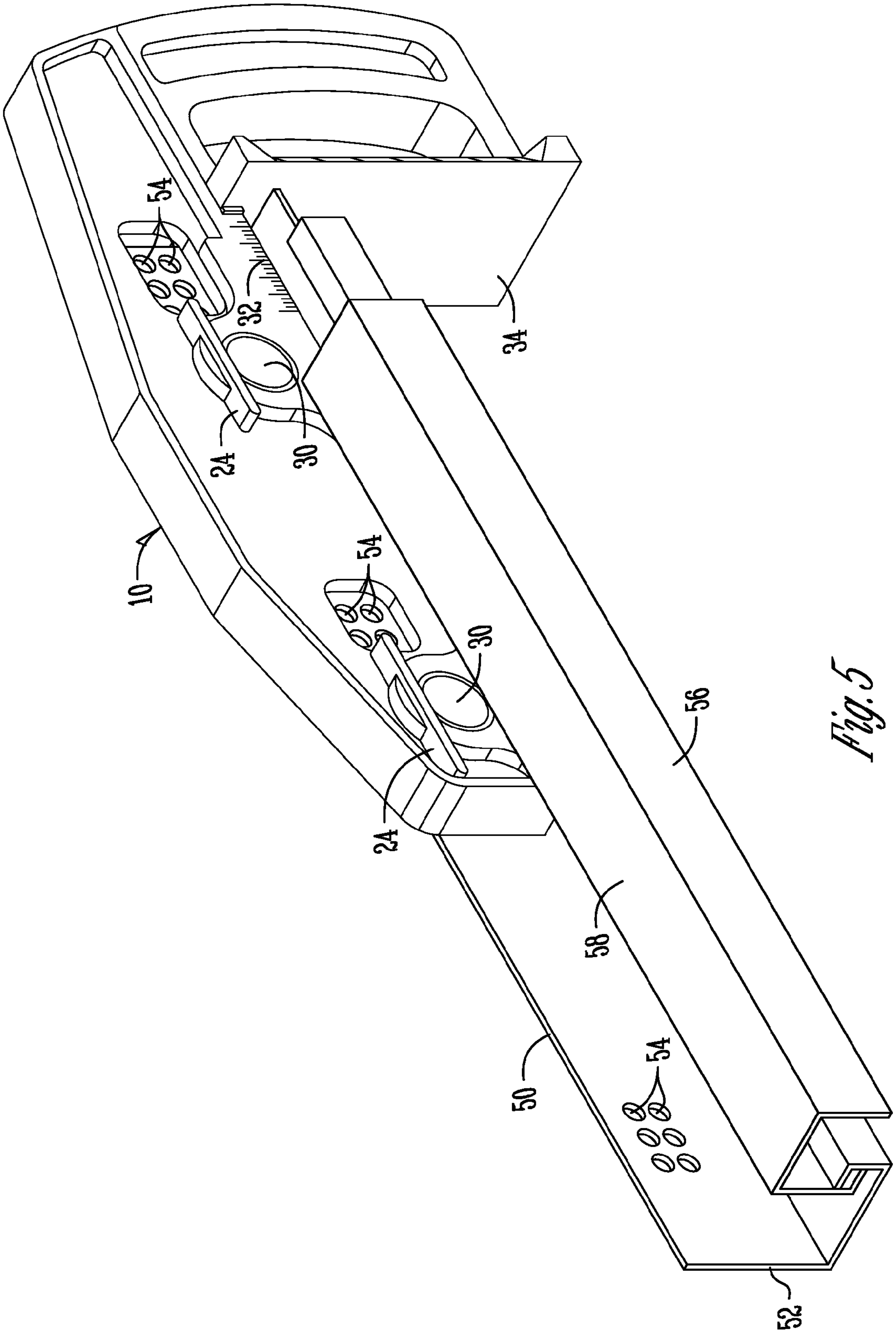
FIG. 5 is a perspective view of the improved tool with an undermount drawer slide secured thereto.
Figure 6:
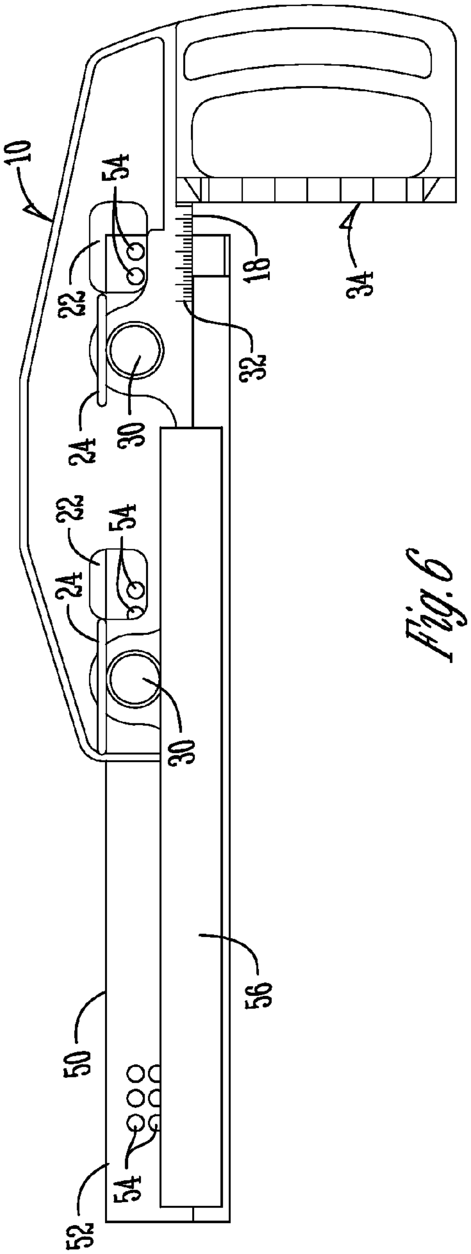
FIGS. 6 and 7 are opposite side views of the tool with an undermount drawer slide positioned on the tool.
Figure 7:
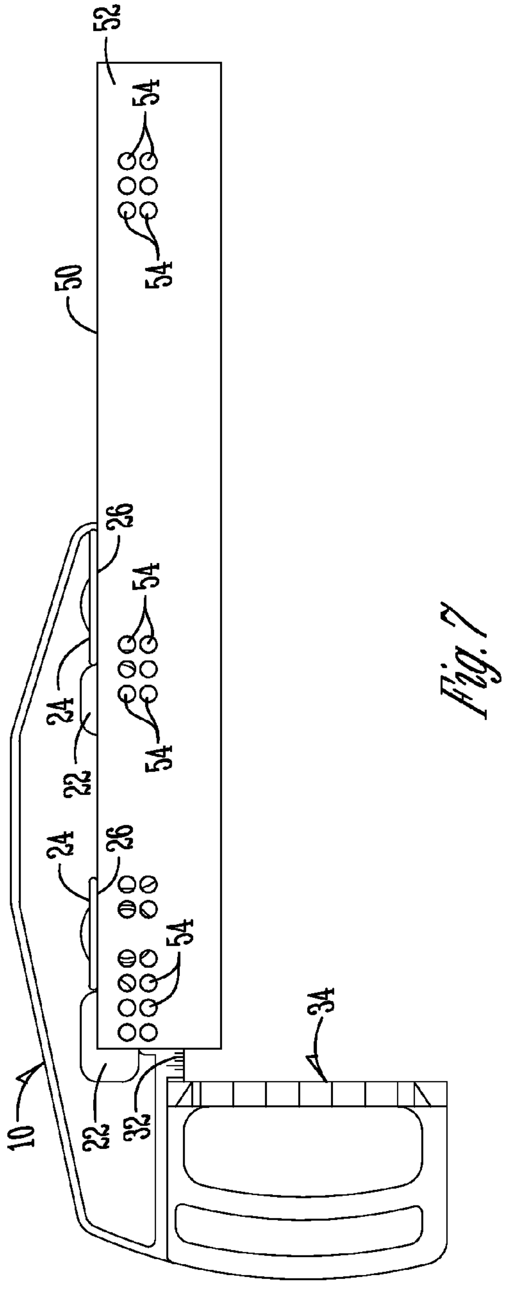
Figure 8:
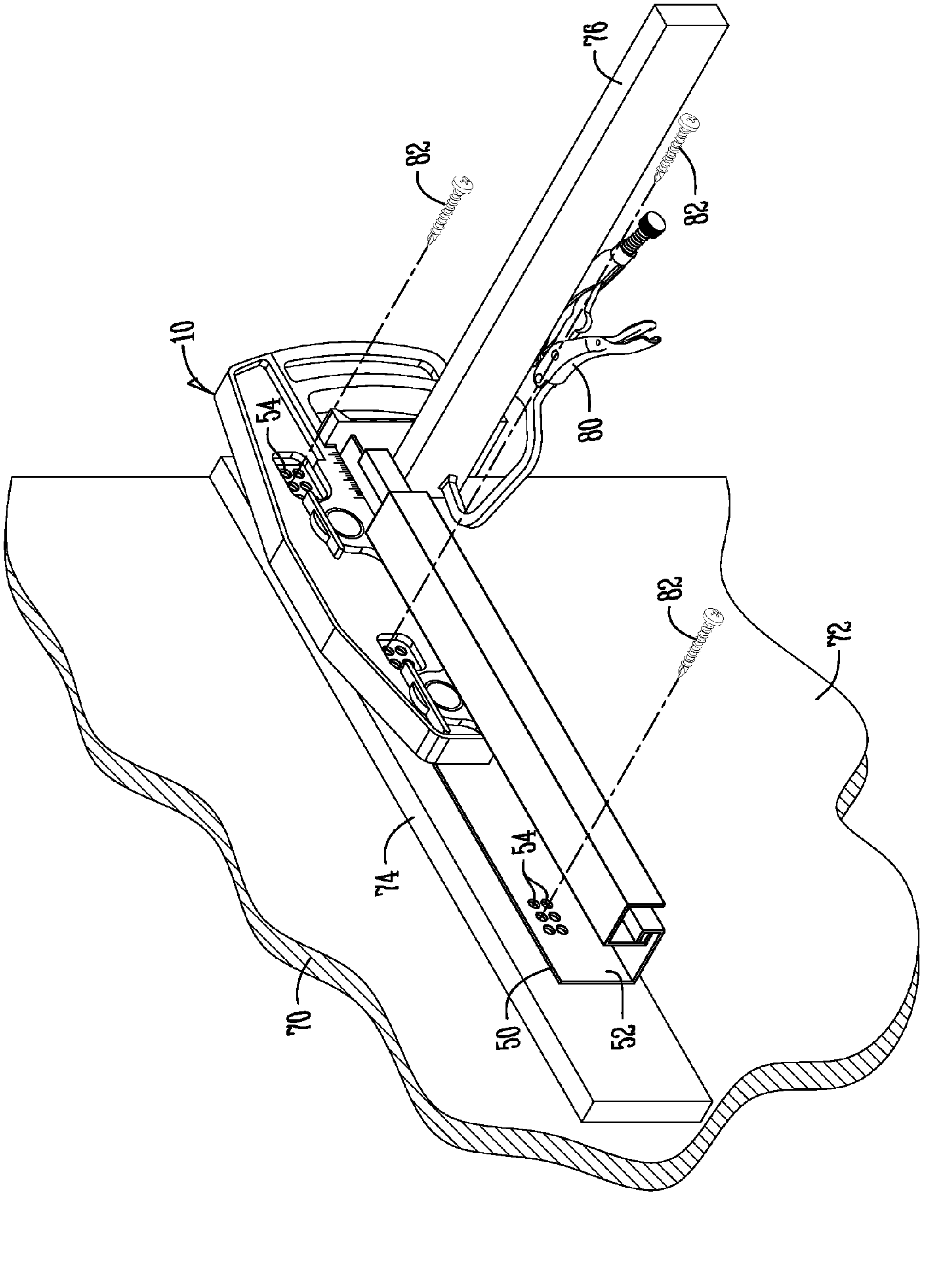
FIG. 8 is a perspective view of the improved tool and undermount drawer slide positioned adjacent a cabinet.

FIGS. 5-7 show the undermount drawer slide 50 secured to the tool 10. As shown in FIG. 7, when the undermount drawer slide 50 is properly positioned, the top of the mounting bracket 52 abuts the bottom 26 of the lips 24. As shown in FIG. 6, when the top of the mounting bracket 52 abuts the bottom 26 of the lip 24, the bottom of the mounting bracket 54 does not rest on the bottom 18 of the arm 12. Therefore, while the bottom 18 of the arm 12 is generally shown as horizontal (or square to the flat face 34), such an arrangement is not necessary.

As further shown in FIGS. 5 and 6, the cutouts 22 are positioned in a manner so that the screw holes 54 of the mounting bracket 52 are visible and accessible to an installer. With this feature, an installer is able to position the drawer slide 50 relative to the cabinet and install screws while the drawer slide 50 is attached to the tool 10.

Additionally, according to the preferred embodiment, the arm 12 of the tool has a width nearly equal to the gap 60 between the mounting bracket 52 and sliding mechanism 56. While this gap is not essential to the tool, it helps prevent the tool from "rocking" in the gap 60. This also ensures that the mounting bracket 52 is not caught on top of the lip 24, thereby changing the orientation of the drawer slide.

As shown in FIGS. 6 and 7, the graduations 32 allow for an installer to control the distance from which the drawer slide is offset from the flat plane 34. The trailing edge of the mounting bracket 52 can be positioned by sighting along the graduations 32. The graduations 32 are preferably located on the arm 12 so that the mounting bracket 52 is flush with the graduations 32, increasing readability.

As further shown in FIGS. 5-7, the magnets 30 securely hold the slide mount 50 flush with the side of the tool 10. The use of strong magnets 30, for example rare earth magnets, ensures that when the tool is positioned at a distance along the graduations 32, the tool remains in place and does not move or otherwise become dislocated.

Method of Using Tool

Further described by the present application is a method of using the tool 10 to attach an undermount drawer slide 50 to a cabinet 70 or other structure.

As shown in FIG. 7, a drawer slide 50 is typically attached inside a cabinet 70 along an inner wall 72 of the enclosure. It may also be preferable to attach the drawer slide to an underside of a desk surface or other structure within the cabinet 70. It also may be preferable to attach the drawer slide 50 to a mounting slat 74 which has better strength for holding a screw or other fastener than the wall 72 of the cabinet 70. Despite these variations, the method of attaching the slide 50 to the cabinet 70 remains the same.

Prior to securing the drawer slide to the cabinet, the drawer slide 50 must be attached to the tool 10. The tool 10 is presented into the gap 60 between the mounting bracket 52 and sliding mechanism 56 as shown in FIG. 5. The mounting bracket 52 of the drawer slide 50 is ensured to butt against the bottom 26 of the lip or lips 24.

As shown in FIG. 7, the drawer slide 50 may then be adjusted along the length of the arm 12 to a preferred position. In many cases, the drawer slide 50 will abut the boss 40, but this distance may be adjusted according to the needs or preferences of the user or installer.

Once the drawer slide is adjusted along its length to a preferred location, the drawer slide 50 is positioned adjacent the cabinet wall 72 or mounting slat 74. If there is a cross slat 76 present, the tool 10 may be positioned so that the flat face 34 is flush with this cross slat 76. Otherwise, the extended arms of the flat face 34 may be used to ensure the flat face 34 is flush with the exterior of the cabinet 70. Several verification steps may be performed to adjust the drawer slide 50 relative to the tool 10. The graduations 36 on the flat plane 34 aide the installer in ensuring that the drawer slide is positioned at an appropriate height. For example, the installer may determine that the top of the cross slat 76 should align with the 2" (4 graduations according to the preferred embodiment) graduation 36 on the flat face 34. This allows the installer to ensure that drawer slides on opposite sides of the cabinet are installed at the same height.

When the installer has achieved the proper placement of the drawer slide 50 in the cabinet 70, it is customary to clamp the tool 10 to the cross slat 76 or cabinet 70 to hold the tool 10 and drawer slide 50 in place. This is achieved by means of a clamp 80, including but not limited to vice grips, c-clamps, or other devices. An installer may also temporarily affix the tool 10 to the cross slat 76 (but preferably not the cabinet 70, as the exterior of the cabinet 70 should remain free from mars) by means of a screw, adhesive, or other fastener commonly known to those skilled in the art.

Finally, once the drawer slide 50 is in the proper position and, preferably, immobilized by a clamp 80, a plurality of screws 82 or other fasteners are inserted through the screw holes 54 to secure the mounting bracket 52 to the cabinet wall 72 or mounting slat 74. Cutouts 22 allow the installer to insert screws 82 into the mounting bracket 52 while maintaining the drawer slide 50 in a proper position.

After securing the drawer slide 50 inside the cabinet 70, the tool 10 may be removed and the installer may continue to secure the drawer slide 50 with additional fasteners 82 as needed.

Due to the symmetry of design, this process may be repeated on the other side of the cabinet to achieve a uniform drawer slide arrangement between the two sides of the cabinet 70 and prevent sticking or unintended drawer movement.

Variations on the Design

Other variations on the design of the tool may also occur without departing from the scope and spirit of the invention.

As previously discussed, the bottom 18 of the arm 12 may not be square to the flat face 34, or even of a non-uniform shape. Similarly, the top 16 of the arm 12 may vary in shape, size, or style.

Additionally, some installers may prefer that, in order to avoid installing drawers at a lower slope (so that the drawer tends to open on its own), the lip or lips 24 are installed at a downward angle, thereby ensuring that the front of the drawer is at a position above the back of the drawer when finally installed. Such an arrangement may be preferable to ensure that the drawer will remain in a closed state, even if the cabinet is installed off level.

As previously described, it may also be preferable to include a stepped lip, so that several sizes of drawer slides may be installed.

Other variations to the preferred embodiment are apparent from the description and described therein. It should be understood to those skilled in the art that a number of variations to the basic structure of the tool may be used without departing from the spirit or allowed claim scope of the invention. Any examples used in the description of the preferred embodiment or shown in the attached figures are by way of example only and are not limiting on the scope of the invention. It is intended that the invention only be limited by the allowed claims and the full range of equivalents thereof.

What is claimed is:

1. A tool for use in installing drawer slides, the tool comprising:

a planar member having a top surface, a bottom surface, and opposing faces;

a first lip extending outwardly from one of the faces, the first lip being spaced from the bottom surface, the lip being adapted to engage an upper edge of a drawer slide;

a plane joined to and extending away from the bottom surface, the plane perpendicular to the lip;

the plane being perpendicular to the faces;

the plane and bottom surface being perpendicular to one another;

a second lip being level with the first lip and at a distance away from the first lip;

access holes passing through the opposing faces of the planar member;

one or more magnets located on the planar member to magnetically retain the drawer slide on the tool;

a handle attached to the plane; and graduations along the planar member.

2. The tool of claim 1 wherein the graduations measure a distance along the planar member from the plane.

3. A method of securing a drawer slide to a cabinet comprising:

providing a drawer slide having a slide component and a vertical component having a top edge and a plurality of holes passing therethrough, the vertical component positioned at a distance from the slide component;

providing a tool having:

a planar member with a top surface, bottom surface, and opposing faces;

one or more lips extending from one or more of the faces between the top and bottom surfaces;

a plane joined to and extending away from the planar member, the plane perpendicular to the one or more lips;

positioning the drawer slide onto the tool so that the tool fits between the slide component and vertical component and the top edge abuts the lip of the tool;

positioning the drawer slide and tool adjacent the cabinet at a preferred position;

securing the plane of the tool to the cabinet;

fastening the drawer slide to the cabinet;

removing the tool from the drawer slide;

positioning the drawer slide on the tool so that it is at a selected distance from the plane; and graduations along one of the opposing faces indicating a distance from the plane.

4. The method of claim 3 wherein the tool further comprises magnets on one or both of the opposing faces, the magnets holding the drawer slide in place.

5. The method of claim 4 wherein the tool further comprises access holes extending through the planar member from one of the opposing faces to the other.

6. The method of claim 5 further comprising the step of aligning the screw holes of the door slide with the access holes of the tool.

7. The method of claim 6 wherein the tool has a variety of screw hole sizes.

8. A tool for use in installing drawer slides to a cabinet, the tool comprising:

a vertical leg having a front, back, top, bottom, and opposing faces;

a horizontal arm having a front, hack, top, bottom, and opposing faces;

a handle in the vertical leg, the handle being generally a curved opening through the opposing faces of the vertical member;

a plane on the vertical leg, the plane having a flat surface parallel to the front of the leg and extending away from the opposing faces of the vertical leg;

a lip on the horizontal arm, the lip being between the top and the bottom of the arm and perpendicular to the flat surface of the plane;

one or more magnets disposed on the arm to magnetically retain the drawer slide on the arm;

the lip and flat surface being square;

the horizontal member including a second lip extending from the face opposite the first lip; and the arm comprising graduations measuring a distance away from the flat surface.

* * * * *